(12) United States Patent
Wrobleski et al.

(10) Patent No.: US 7,434,812 B2
(45) Date of Patent: Oct. 14, 2008

(54) PUTTY COMPOSITION AND METHOD

(75) Inventors: John Wrobleski, Andover, NJ (US); Fred Richard Scholer, Hightstown, NJ (US)

(73) Assignee: Hercules Chemical Company Incorporated, Passaic, NJ (US)

( * ) Notice: Subject to any disclaimer, the term of this patent is extended or adjusted under 35 U.S.C. 154(b) by 353 days.

(21) Appl. No.: 11/286,107

(22) Filed: Nov. 23, 2005

(65) Prior Publication Data
US 2007/0114726 A1    May 24, 2007

(51) Int. Cl.
*F16J 15/16* (2006.01)
*F16J 15/02* (2006.01)
*F16J 15/10* (2006.01)

(52) U.S. Cl. .................................. 277/312; 277/602
(58) Field of Classification Search .................. 277/650; 524/588
See application file for complete search history.

(56) References Cited

U.S. PATENT DOCUMENTS

| | | | |
|---|---|---|---|
| 4,534,926 A | 8/1985 | Harriett | |
| 4,629,648 A | 12/1986 | Minick et al. | |
| 4,956,021 A | 9/1990 | Kerze | |
| 5,319,021 A | 6/1994 | Christy | |
| 6,238,473 B1 * | 5/2001 | Maxwell et al. | 106/486 |
| 2001/0037848 A1 * | 11/2001 | Sciarrino et al. | 156/71 |

OTHER PUBLICATIONS

Bruce W. Maki HammerZone.com Part 2: Bath Vanity and Lavatory: Connecting the Plumbing. http://www.hammerzone.com/archives/bath/projects/remod_w1/vanity_s/faucet_moen84200.htm.*

International Search Report in International Application No. PCT/US2006/45305, mailed Oct. 4, 2007.

* cited by examiner

*Primary Examiner*—Randy Gulakowski
*Assistant Examiner*—Robert Loewe
(74) *Attorney, Agent, or Firm*—Stroock & Stroock & Lavan LLP

(57) ABSTRACT

Generally speaking, in accordance with the invention, a putty is provided that can include many or all of the handling characteristics of a traditional plumber's putty, but with reduced staining qualities. Such putty can facilitate substantially stain free installations. Putties in accordance with the invention can contain combinations of polymers or oligomers, solvents, fillers and optional rubbery materials. A composition according to the invention is preferably sufficiently stain-free to be used on porous stone, such as marble and granite, without damaging the appearance of the stone. This is achieved by eliminating oil completely, or at least substantially, or restricting their ability to cause stains sufficiently. Because compositions of the invention can be made to be free of oils, they can also have the effect of eliminating the greasy feeling to the hands, which can occur when handling traditional putty. Putties in accordance with preferred embodiments of the invention can provide a degree of tackiness for adhesion and gap fill purposes during installation, as well as a degree of abrasiveness so that pressure from the tightening process will not cause the putty to slip. Of these benefits, one particularly important advantage is the lack of staining on most, if not all, surfaces traditionally used to finish kitchens and baths, including porous stones and other porous materials, such as unglazed ceramics.

39 Claims, No Drawings

US 7,434,812 B2

PUTTY COMPOSITION AND METHOD

BACKGROUND OF THE INVENTION

The invention relates generally to a putty composition and in particular to a putty composition that can be used by plumbers to set faucets, sinks, tubs and other components in the bath and kitchen in order to obtain a water proof seal for those components.

Plumber's putty is a well-known product used in the plumbing and construction industry. It can be used to seal fixtures such as sinks, tub strainers, faucets located in the bath or kitchen areas. Plumber's putty maintains a stable consistency and can be used to fill voids during installation. Plumber's putty is generally pliable, tacky to surfaces and resistant to water. The putty should be easily manipulated by hand and can generally be rolled into any shape consistent with the sealing job at hand.

Another preferred characteristic of plumber's putty is that a cylindrical ball of putty can be cleanly broken by rapidly pulling the ball apart. This "fracturing" ability is an important feature of the putty, because it allows plumbers to easily and quickly isolate specific quantities to be rolled into a desired shape for any application at hand.

Traditional plumber's putty contains a variety of oils and mineral solvents dispersed in clays and inorganic minerals, such as calcium carbonate. Preferred compositions do not dry out or crack once in place for long periods of time, preferably not during the lifetime of the appliance being installed.

While traditional plumber's putty is useful, it has drawbacks. The oil in the putty can leave a permanent stain or shadow on some porous stones, such as some marbles or granites. The shadow often appears within hours of installation and cannot be removed by cleaning or by physical methods without permanently affecting the surface of the stone. This has been a serious problem in the kitchen/bath installation industry especially because porous stones are very expensive to install or replace.

Plumbers have used a variety of techniques to try to circumvent this problem without success. A clear acrylic coating can be applied to the area in contact with the plumber's putty. However, this does not guarantee that over time, the oils from the putty will not work their way toward uncovered stone.

Another alternative to avoid the oil stain is by using silicone caulk. However, it lacks the preferred cohesiveness of plumber's putty and is more difficult to apply. Silicone caulk and other caulking materials also lack the same fracturing ability as mentioned above. Silicone caulks are often used as a substitute but are the consistency of a thick liquid. When used, the excess squeezes out from the assembled pieces and is difficult to clean off the exposed surface areas. Once cured, future disassemble for repairs or replacement is difficult and can result in damage to the stationary components due to the permanence of the silicone.

Stone sealers have also been used to avoid the stains caused by plumber's putty. However, they require as much as 24 hours to dry and cure. This prevents the installer from having immediate access and can slow down projects. Also the sealer may cause a slight discoloration to the area to which it is applied creating a contrast with the outlying surfaces.

Certain types of plumber's putty are often advertised as stainless putty. However, they are mistakenly characterized as so, because results from numerous tests conducted on soft, porous stone and other materials typically reveal the immediate presence of a stain or shadow. Some plumber's putty, although sold as "stainless putty," also include warnings in the directions that it should not be used with porous stone such as marble or granite. Using these plumber's putties on porous stone can result in considerable damage to the appearance of the stone and is not repairable by any cleansing process.

Accordingly, it is desirable to provide putty that overcomes drawbacks of conventional putties.

SUMMARY OF THE INVENTION

Generally speaking, in accordance with the invention, a putty is provided that can include many or all of the handling characteristics of a traditional plumber's putty, but with reduced staining qualities. Such putty can facilitate substantially stain free installations. Putties in accordance with the invention can contain combinations of polymers or oligomers, solvents, fillers and optional rubbery materials. A composition according to the invention is preferably sufficiently stain-free to be used on porous stone, such as marble and granite, without damaging the appearance of the stone. This can be achieved by eliminating oil completely, or at least substantially, or restricting their ability to cause stains sufficiently. Because compositions of the invention can be made to be free of oils, they can also have the effect of eliminating the greasy feeling to the hands, which can occur when handling traditional putty. Putties in accordance with preferred embodiments of the invention can provide a degree of tackiness for adhesion and gap fill purposes during installation, as well as a degree of abrasiveness so that pressure from the tightening process will not cause the putty to slip. Of these benefits, one particularly important advantage is the lack of staining on most, if not all, surfaces traditionally used to finish kitchens and baths, including porous stones and other porous materials, such as unglazed ceramics.

Putties in accordance with the invention can contain a tack agent to adhere to the surface of the stone or other material being sealed. They can also include a flex agent to impart softness and moderate the feel of the tack to the hand. They can include a specialized or even standard clay, which imparts smoothness and consistency to the invention. They can also include other fillers, which provide bulk and cost control. The tack agent and the flex agent should either block the movement of chemicals into the porous stone or be non-migratory, so as to not migrate into the stone.

The tack agent and the flex agent can be used to replace the oil and spirits used in traditional plumber's putty. The tack agent can be selected from a series of polymers or oligomers, which have the attributes of being non-migratory on porous stone and/or act as a blocking agent to prevent migration into the stone. The flex agent can be selected from the family of natural and synthetic rubber and rubber-like compounds.

The preferred tack agents of this invention include polymers or oligomers from the family of polymeric plasticizers. One preferred flex agent includes the family of silicone rubber. The polymeric plasticizer provides tack and adhesion properties. The silicone rubber imparts flexibility, ductility and softness.

The polymeric plasticizer can be complemented with or replaced by a variety of polymers including polyalkanes, alkenes and branched polymers. Examples include polybutane, polybutene and polyisobutylene. The polymeric plasticizer can also be replaced by alkyl dibasic acid esters, esters of trimellitate acid or other similar polyacids. Silicone rubber can be replaced by alkyd rubbers.

The inorganic minerals and clays employed in this invention are similar or identical to those used in typical plumber's putties. Calcium carbonate is particularly acceptable. Clays based on montmorillonite structures, such as kaolin clay, can provide the balance of the filler.

The ratio of liquids to solids is also important to both the non-staining characteristics and physical properties of the stainless putty. The stainless putty is best manufactured, packaged and used, when the ratio of liquids to solids ranges from about 1:3 to 1:6, preferably about 1:4 to 1:5.

Accordingly, it is an object of the invention to provide an improved putty.

An object of the invention is to provide a stainless putty without compromising the requirements and use characteristics of traditional plumber's putty.

Still another object of this invention is to provide a pliable, elastic putty that has a degree of tack, allowing sufficient adhesion to withstand the pressure of tightening, and has low stain characteristics.

Still another object of the invention is to provide an improved substantially stain free installation process.

The invention accordingly comprises the method of forming a composition of matter, a composition produced and the method of using a composition which will be exemplified and described below and the scope of the invention will be indicated in the claims.

DETAILED DESCRIPTION OF THE PREFERRED EMBODIMENTS

A preferred embodiment of the invention comprises, but is not limited to, a combination of polymers or oligomers (tack agents), and/or rubber compounds (flex agents), and should also include solvents and/or fillers. The putty can be manufactured using a variety of mixing equipment that is well known in the art. The preferred methods of mixing include either utilizing a horizontal or vertical blender or an extrusion process. The preferred sequence of mixing, regardless of the equipment used, involves the addition of the functional inorganic minerals followed by a blend of or individual components of the liquids, completed by the addition of the bulk filler(s). Two liquid components, the tack agent and the flex agent, can be premixed or added individually. The addition of the liquid components can be facilitated by warming the liquid components, but this is not a required step of the mixing process, Typically for a 600-1000 lb batch prepared in a sigma mixer with an 80-100 hp motor, the solid components are added in the following order: montmorillonite clays, bentonite clays and calcium carbonate. The solids are then preferably followed by the tack agents, typically a polymeric plasticizer, and a flex agent, typically a modified silicone rubber. The components are mixed, during which time the bulk temperature may reach 130-140° F. The mixture is then completed by adding the remaining inorganic filler, typically calcium carbonate. A preferred composition comprises about 5-50% liquids and about 95-50% solids, more preferably about 10-40% liquids and about 90-60% solids.

The ratio of liquids to solids is also important to both the non-staining characteristics and physical properties of the stainless putty. The stainless putty is best manufactured, packaged and used, when the ratio of liquid to solvent ranges from about 1:3 to 1:6, preferably 1:4 to 1:5.

The tack agent, a polymer or oligomer, can act as an adhesion promoter, and help to bind the components to each other as well as to the surface of the area under construction. Examples of a tack agent include polyalkenes. The use of polymeric plasticizers as the adhesion promoters is preferred. Examples of these include polymers based on dibasic acids, such as adipic acid, based on the general formula, $HOOC(CH_2)_nCOOH$, where n=2-20, preferably n=6-10. Commercial examples include the Paraplex series offered by CP Hall, such as Paraplex G-40, and the Admex series offered by Velsicol, such as Admex 429. The range of composition for polymers is about 1 to 25%, preferably about 10% to 20% of the total weight.

Preferred polymers or oligomers have the attributes of being either non-migratory on porous stone or act as a blocking agent to prevent migration into the stone or both. Migration of the oil stain is measured by placing 10 grams of the finished putty on a porous stone and then measuring the diameter of the ring, caused by the migration of the staining oil, after 24 hours. A traditionally plumber's putty, which utilizes animal or vegetable oils, will cause a shadow stain within minutes of application. Preferred putties will exhibit substantially no detectable stain under these conditions.

The polymeric plasticizer can be complemented or replaced by other adhesive materials, such as polyalkanes, polyalkenes, polyisoalkenes and branched polymers. Examples include polybutane, polybutene and polyisobutylene and di- and tri basic acid esters of such acids, as azelaic or trimellitate. The polymeric plasticizer can also be replaced by aryl dibasic acid esters, esters of trimellitate acid or other similar polyacids such as 1,3,5-phenyltricarboxylic acid.

The polymeric plasticizer used in the current invention is exemplified by a high molecular weight (about 4000-100,000) polyester adipate with average molecular weight of 4000-8000. CP Hall's Paraplex G-40, available from CP Hall of Bedford Park, Ill., is an example of such polymeric plasticizer. Preferred polymeric plasticizers have a molecular weight range of 3000-6000, preferably 4000-5000 and a viscosity range of about 1500 to 7500 preferably about 3300-5500 cst at 80° C. CP Hall's Paraplex G40 is an example.

Another preferred composition includes the use of polyisobutylene, where the polyisobutylene ranges from about 2-15%, preferably 5-10% of the total putty composition. The polyisobutylene is best exemplified by a high molecular weight polymer based on isobutylene and has a typical molecular weight range of 40,000 to 150,000, preferably 50,000 to 110,000, most preferably, about 70,000. An example of this polymer is Vista LM-MS supplied by Exxon Chemicals. Vistanex polyisobutylene polymers are highly paraffinic hydrocarbon polymers. They are highly inert, tasteless and non-toxic.

Another preferred adhesion promoter includes hydrocarbon fluids. These fluids differ from the fluids used in conventional putties because they do not migrate and provide a specific level of tack. The hydrocarbon fluid is best exemplified by a high molecular weight polymer based on isobutylene and has a typical molecular weight range of about 100,000, typically from 20,000 to 120,000

A preferred flex agent of the invention is a rubber-like compound to add flexibility, ductility and softness to the putty. As used herein, the term "rubber-like" materials refer to elastomeric type products, such as liquid natural rubbers (isoprenes), synthetic rubbers, butyl rubbers and cross-linked rubbers. Examples of acceptable rubber-like compounds include the DPR, Isolene, Kalene and Kalar series offered by Elementis of Hightstown, N.J.

The adhesion promoter is complemented by a rubber-like material, acting as the softening promoter. This supplies a certain degree of adhesion as well as improves the ductility and softness of the composition. The rubber-like material should be included in the range from 1% to 10% preferably 3-4% of the total composition.

The preferred rubber comes from the family of silicone rubbers, exemplified by a low molecular weight (preferably about 200 to 1000) gum comprising polydimethylvinyl siloxane with an average molecular weight of about 500 and advantageously in the range of 400 to 600. Products that typify this rubber include GE's Silicone SE-64. SE-64 is a translucent form of polydimethylvinyl siloxane with a specific gravity of 0.98 and a medium vinyl content of 2-4 mol %. Another preferred rubber is alkyd rubber, which can replace some or all of the silicone rubber.

No other liquid besides those mentioned above are typically required for the final composition. However, non-aggressive solvents, particularly non-staining or non-migratory, such as mineral spirits or hydrocarbons (e.g., Shellflex 2300 offered by Elf Lubricants) can be employed.

The solid portion of the composition, acting as fillers, can include clays, such as montmorillonite clay and bentonite clays, which act as rheological additives as well as minerals, such as calcium carbonate. Other acceptable fillers included processed mineral fibers, such as PMF Fiber offered by Sloss Industries of Birmingham, Ala. The solid mixture advantageously makes up 60-90% of the total putty composition, preferably approximately 70-80%, most preferably about 75%. Preferred solid components comprise a mixture of calcium carbonate and kaolin in a ratio of about 3:1 to 5:1, preferably about 4:1 with a total range of about 70-80%, preferably 74-78% of the total putty composition. The montmorillonite clay provides a certain degree of smoothness and structural stability to the putty. The selection of montmorillonite clays similar in structure and composition is also critical because improper selection or loading can result in premature hardening of the putty over a 24-72 hour period.

A preferred montmorillonite clay is kaolin, exemplified by the product supplied under the trade name Royal Queen Clay by Unimin Corporation of Dalton, Ga.

The calcium carbonate provides bulk, and moderates the final cost of the composition. A preferred calcium carbonate, exemplified by the product supplied under the trade name Medusacarb by HM Royal of Trenton, N.J.

In addition to montmorillonite clays and calcium carbonates, other minerals can be selected from the family of rheological additives, such as bentones or, binders, such as fumed silica. These should be used in low quantities in order to avoid premature aging or solidification of the putty.

The current invention is substantially or completely stain free.

1 inch diameter, ¼ inch disks of putties composed in accordance with the invention can be pressed uniformly with a ½ pound weight onto a white marble surface for one month and leave no observable stain. Moreover, such putty can then be rolled, by hand, back into a ball.

The characteristics of the putties in accordance with the invention were tested with a sample of the stainless putty. In order to compare the results, a traditional plumber's putty was also applied in the same test conditions. The compositions of the sample stainless putty and the traditional plumber's putty are detailed in the following table:

| Stainless putty | | Original plumber's putty | |
|---|---|---|---|
| Component | % by weight | Component | % by weight |
| Paraplex G-40 | 18 | Hydrocarbon Oil | 13 |
| Bentone 34 | 1 | Bentone 34 | 2 |
| Royal Queen Clay | 8 | Royal Queen Clay | 8 |
| Medusacarb | 68 | PMF Fiber | 1 |
| Silicone Rubber | 5 | Medusacarb 18 | 70 |
| | | Oils | 5 |
| | | Mineral spirits | 1 |

To test the stain free nature of putties in accordance with the invention, the putties were rolled into ¾-1 inch diameter balls. The balls were firmly pressed into a clean surface on either a porous marble or granite test sample.

Within 1-2 hours, the first stain or shadow appeared surrounding the traditional plumber's putty. The stainless putty was tested for a minimum of 1 month, preferably 6 months, with no appearance of a stain or shadow surrounding the stainless putty. Over the 6-month period the stainless putty samples also maintained their integrity in that they did not dry out, or become friable or lose their plasticity. The samples can be removed from the surface of the stone after six months, rolled by hand and reapplied to the stone surface for further testing.

Another superior characteristic of the current invention is its ability to be rolled and shaped into various forms. Using the compositions above, when a 50-gram sample of stainless putty and 50-gram sample of the traditional plumber's putty are rolled into cylindrical balls with a diameter of about ½ to ¾ inches by 3 to 4 inches long and slowly stretched by hand to a distance of at least 6-8 inches, both samples elongate to approximately the same distance (at least 6 inches.) Both samples were rolled into a log approximately ¼ inch in diameter. The stainless putty can have a significantly higher roll out than the traditional plumber's putty. On the other hand, a swift pull will break off a piece as desired.

| | Weight of Sample | Rolled to ¼" log |
|---|---|---|
| Plumbers Putty | 50 | 6 inches |
| Stainless Putty | 50 | 9 inches |

The stainless plumbers putty can also be tested for hardness through the use of a penetrometer. It can have about the same durometer reading both at 25° C. and 50° C. as the traditional plumber's putty.

| | Durometer Reading @25° C. | Durometer Reading @ 50° C. |
|---|---|---|
| Plumbers Putty | 160 | 180 |
| Stainless Putty | 160 | 180 |

The stainless putty also exhibits the same fracturing characteristics as traditional plumber's putty. Allowing plumbers to easily separate the desire amount to be used. A fracture test is best described as placing a segment of the putty ball between thumb and index finger to separate a piece of the putty from the original ball or mass. The piece will separate cleanly, whereas a failure is represented by the piece continuing to stretch without breakage.

EXAMPLES

The following examples are provided for purposes of illustration only and are not intended to be construed as limiting the scope of the invention.

Comparative Example 1

Conventional Staining Putty

| Component | % by weight |
| --- | --- |
| Mineral spirits | 1 |
| Hydrocarbon oil | 28 |
| Animal oil | 3 |
| Kaolin clay | 11 |
| Calcium carbonate | 55 |
| Fiber | 2 |

Example 2

Stainless Putty of the Invention

| Component | % by weight |
| --- | --- |
| Polyisobutylene | 7 |
| Silicone rubber | 13 |
| Mineral spirit | 7 |
| Royal Queen Clay | 7 |
| Calcium carbonate | 62 |
| PMF-34 Fiber | 4 |

Example 3

Stainless Putty of the Invention

| Component | % by weight |
| --- | --- |
| Paraplex G-40 | 18 |
| Silicone SE-64 | 5 |
| Calcium Carbonate | 68 |
| Kaolin Clay | 8.5 |
| Bentone 34 | 0.5 |

What is claimed is:

1. A method of installing a plumbing fixture into an opening in a solid surface formed of porous material, comprising seating the fixture in an opening of a solid surface formed of porous material; sealing the interface where the fixture meets the solid surface with a putty formulated to avoid detectable stain to the solid surface, the putty comprising a liquid component comprising a tack agent comprising a polymeric plasticizer, a flex agent comprising at least one synthetic or natural rubber, and a solid component comprising at least one clay, the putty formulated such that when a 50-gram ball is pressed flat to a thickness of about 0.25 to 0.5 inches on a white marble surface, substantially no stain will be transferred to the marble after more than 12 hours of the putty contacting the marble.

2. The method claim of claim 1, wherein substantially no stain will be transferred to the marble after more than 1 month of the putty contacting the marble.

3. The method of claim 1, wherein the tack agent comprises a polymeric plasticizer, the flex agent comprises a silicone rubber, and a solid component comprises at least one clay.

4. The method of claim 1, wherein the solid surface is marble or granite.

5. The method of claim 1, wherein the putty is applied by hand.

6. The method of claim 1, wherein a selected amount of the putty is isolated by rapidly pulling the portions apart.

7. The method of claim 1, wherein the putty is first rolled into a roll and is firmly pressed onto the solid surface on which the plumbing fixture rests.

8. The method of claim 1, wherein the putty is first hand rolled into an elongated log and applied around the plumbing fixture.

9. The method of claim 1, wherein the puffy can be removed without leaving detectable stain and can be reshaped and reused.

10. The method of claim 1, wherein the flex agent comprises polyisobutylene.

11. The method of claim 1, wherein the tack agent comprises silicone rubber.

12. The method of claim 1, wherein the solid component comprises kaolin clay.

13. The method of claim 1, wherein the putty is substantially free of oil.

14. The method of claim 1, wherein the liquid component constitutes about 10-40% of the composition and the solid component constitutes about 60-90% of the composition.

15. The method of claim 1, wherein the tack agent and the flex agent block the movement of staining materials from the putty formulation into a the porous material.

16. The method of claim 1, wherein a 50-gram ball of the putty can be hand rolled into a substantially uniform log about 0.25 inches in diameter and a sharp hand pull on the ball can break off a piece of a selected size.

17. The method of claim 1, wherein of the putty is pressed flat against a flat white marble surface and allowed to remain in contact with the marble surface for more than 1 month and substantially no perceptible stain will be transferred to the structure.

18. The method of claim 1, wherein the tack agent component comprises at least one member selected from the group consisting of polyalkanes, polyalkenes, polyisoalkenes and branched polymers.

19. The method of claim 1, wherein the tack agent component comprises at least one member selected from the group consisting of alkyl dibasic acid esters and esters of trimellitic acid.

20. The method of claim 1, wherein the tack agent component comprises a polymeric plasticizer.

21. The method of claim 1, wherein the flex agent component comprises a silicone rubber.

22. The method of claim 1, composition of claim 1, wherein the flex agent component comprises an alkyd rubber.

23. The method of claim 1, wherein the solid component comprises a montmorillonite clay.

24. method of claim 1, wherein the solid component comprises calcium carbonate.

25. The method of claim 1, wherein the solid component comprises at least one member selected from the group consisting of bentonite clay, mineral fibers, rheological additives and mixtures thereof.

26. The method of claim 1, wherein the tack agent comprises a polymeric plasticizer, the flex agent comprises a silicone rubber, and the solid component comprises calcium carbonate and kaolin clay.

27. The method of claim 1, wherein the tack agent component is a high molecular weight polymeric plasticizer with an average molecular weight range of 4000-8000 and the flex agent component comprises a low molecular weight gum comprising polydimethylvinyl siloxane with an average molecular weight in the range of 400-600.

28. The method of claim 1, wherein the solid component comprises about 74-78% of the composition and comprises a combination of calcium carbonate and kaolin clay.

29. The method of claim 1, comprising at least one polyester adipates having a molecular weight range of 4000-5000 and a viscosity range of 3300-5500 cst at 80°C.

30. The method of claim 1, comprising polyisobutylene, a silicone rubber, calcium carbonate and kaolin clay.

31. The method of claim 30, wherein the polyisobutylene comprises about 5-10% of the composition, and silicone rubber comprises about 10-20% of the composition.

32. The method of claim 1, wherein the polyisobutylene is a high molecular weight polymer based on isobutylene and has a molecular weight range of from 20,000 to 120,000and the silicone rubber is a low molecular weight gum comprising polydimethylvinyl siloxane with an average molecular weight of about 500.

33. The method of claim 1, wherein at least a portion of the tack agent component comprises a combination of hydrocarbon oils, the flex agent comprises a silicone rubber, and the solid component comprises calcium carbonate and kaolin clay.

34. The method 33, wherein the hydrocarbon oils comprises about 5-10% of the composition, and the silicone rubber comprises about 10-20% of the composition.

35. The method of claim 33, wherein the mixture of hydrocarbon oils comprise a high molecular weight polymer based on isobutylene and have a molecular weight range of 20,000 to 120,000the silicone rubber is a low molecular weight gum consisting of polydimethylvinyl siloxane with an average molecular weight of about 500.

36. The method of claim 23, wherein the solid component constitutes about 74-78% of the composition and comprises a mixture of calcium carbonate and kaolin clay.

37. A method of installing a plumbing fixture, comprising seating the plumbing fixture in a surface comprising porous material and disposing a putty composition between the fixture and the surface, the putty composition, formulated to avoid detectable staining when applied to a porous surface, comprising: 16 -20% polymeric plasticizer; 0.5-3% bentonite clay; 6-10% kaolin clay; 66-70% calcium carbonate; and 3-7% silicone rubber.

38. The method of claim 37, wherein the polymeric plasticizer component comprises polymers based on dibasic acids, based on the general formula, $HOOC(CH_2)_nCOOH$, where n=2- 20.

39. The method of claim 38, wherein n=6-10.

* * * * *